United States Patent [19]
Veith

[11] 3,740,072

[45] June 19, 1973

[54] FOOT CLEANER DEVICE FOR VEHICLES

[76] Inventor: Louis A. Veith, Route No. 1, Pierz, Minn.

[22] Filed: June 10, 1971

[21] Appl. No.: 151,866

[52] U.S. Cl............................. 280/164 A, 15/237
[51] Int. Cl................................................ B60r 3/04
[58] Field of Search..................... 280/164 A, 166; 15/237; 296/1 F

[56] References Cited
UNITED STATES PATENTS

| | | | |
|---|---|---|---|
| 1,212,111 | 1/1917 | Roos | 280/164 A |
| 2,557,229 | 6/1951 | Lyster | 280/164 A |
| 2,991,118 | 7/1961 | Sleger | 280/166 X |
| 3,097,388 | 7/1963 | Gresko | 280/164 A X |

FOREIGN PATENTS OR APPLICATIONS 300,482  11/1928  Great Britain..................... 280/166

Primary Examiner—Leo Friaglia

[57] ABSTRACT

A device for attachment to automobiles, trucks and the like. This device includes a bracket which mounts to the vehicle and has pivotally secured to it, a nippled member for scraping slush and the like from one's shoes.

3 Claims, 2 Drawing Figures

PATENTED JUN 19 1973 3,740,072

INVENTOR.
LOUIS A. VEITH

FOOT CLEANER DEVICE FOR VEHICLES

This invention relates to accessories, and more particularly to a foot cleaner device for automotive vehicles.

It is therefore a primary purpose of this invention to provide a foot cleaner device which will be mounted on the lower channel groove in the door opening of a vehicle in order that one may scrape slush and other matter from the soles of persons entering the vehicle.

Another object of this invention is to provide a device of the type described which will be pivotable sideways as well as upwards so as to prevent the device from being struck accidentally.

Still another object of this invention is to provide a foot cleaner device which will serve to prevent the accumulation of slush and chemicals on the vehicle's mats, thus giving the mats a much longer endurance.

Yet another object of this invention is to provide a device of the type described which will be demountable from the vehicle when desired and the device is of such structure so as to be secured in a position approximately six inches back of the hinged side of the vehicle's door on the lower channel groove of the door frame.

A still further object of this invention is to provide a unit of the type described which may be used in plurality, one at each door of the vehicle.

Other objects of the present invention are to provide a foot cleaner device for vehicles which is simple in design, inexpensive to manufacture, rugged in construction, easy to use and efficient in operation.

Figure 1:
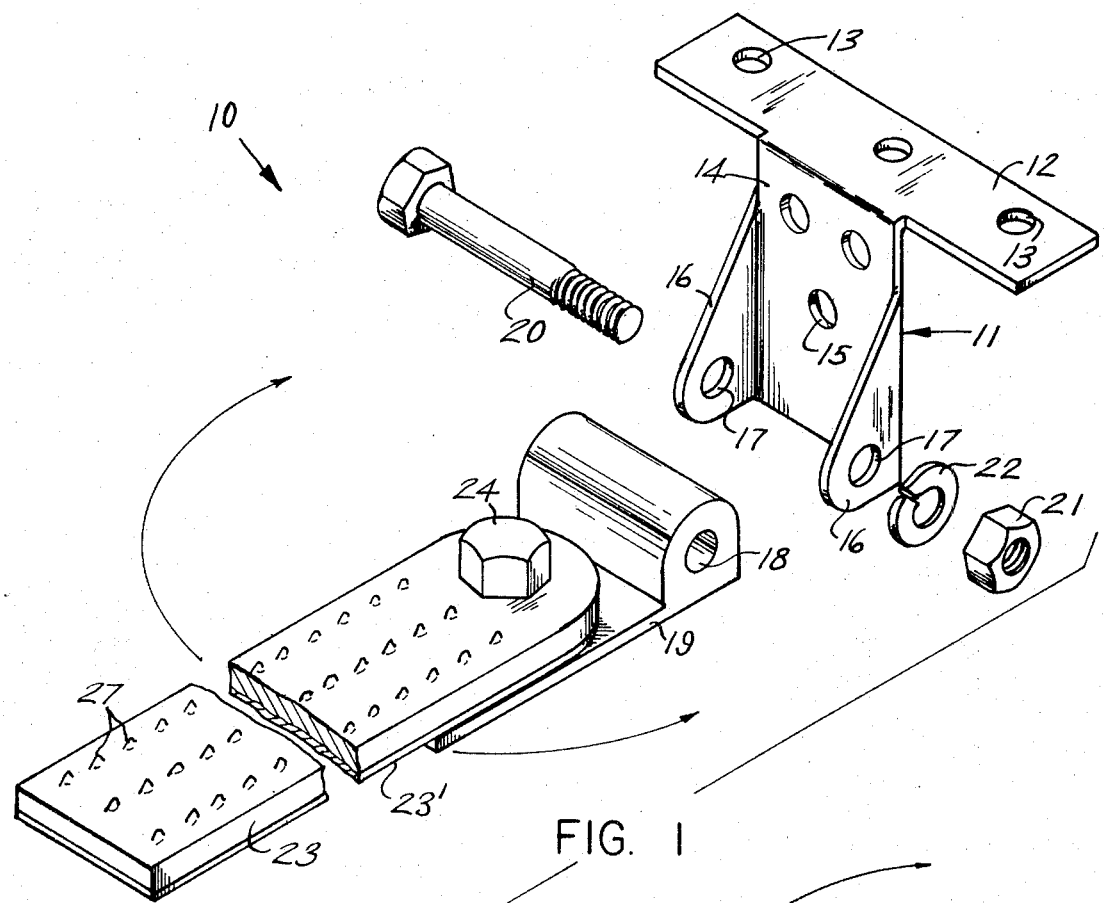
Figure 2:
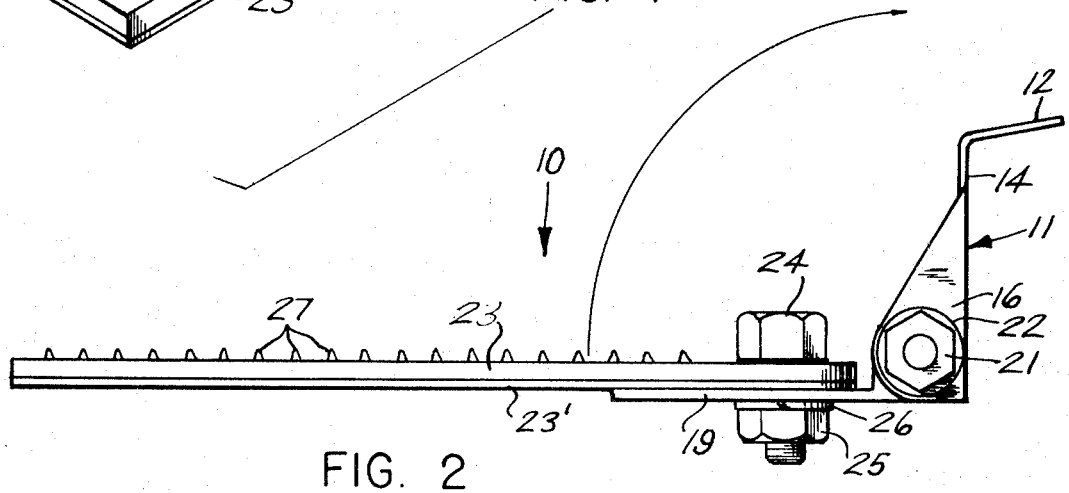

These and other objects will become readily evident upon a study of the following specification together with the accompanying drawing wherein:

FIG. 1 is an exploded perspective view of the present invention shown partly broken away; and FIG. 2 is a side view of FIG. 1 shown in elevation.

According to this invention, a foot cleaner device for automotive vehicles is shown to include a mounting bracket 11 having an upper flange 12 with a plurality of spaced apart openings 13 for receiving suitable fasteners in order to secure device 10 to a vehicle (not shown). The main body 14 of bracket 11 is provided with a plurality of spaced apart openings 15 providing additional securement means for bracket 11 if desired. Extending from the main body 14 are a pair of parallel spaced apart ears 16 having each, an aligned opening 17 therethrough which when aligned with opening 18 of plate 19, will receive bolt 20 which is secured in position by means of a nut fastener 21 against a lock washer 22. The bolt 20 enables plate 19 to be pivoted upwards in order that it will be out of the way when not in use.

A hard rubber strip 23 is bonded to plate 23' which is pivotable horizontally to plate 19 by means of bolt fastener 24. Bolt fastener 24 is extended through strip 23, plate 23' and plate 19 and receives a nut fastener 25 which abuts with a lock washer 26.

It will be noted that the rubber strip 23 has moulded and extending therefrom a plurality of spaced apart nipples 27 which provides a means for fixedly engaging a sole of a shoe in order to remove the slush or other foreign matter therefrom.

In use, plate 19 and its attached plate 23' may be pivoted upwards about bolt fastener 20 when device 10 is not in use.

It will be noted further that the rubber strip 23 and its bonded plate 23' may be readily pivoted horizontally to the side of the vehicle and if struck by an object when the vehicle is traveling, plate 23' and its associated rubber strip 23 automatically pivots to the side of the vehicle.

What I now claim is:

1. A foot cleaner device for automotive vehicle, comprising a mounting bracket, a flange carried by said mounting bracket for securing said device to a vehicle upper part of a rocker panel in a door opening and is secured by suitable fasteners, a pair of laterally spaced vertically extending ears carried by said bracket and extending outwardly therefrom, a plate pivotally connected to said ears by bolt means extending transversely through aligned apertures in said ears and plate for vertical swinging movement of said plate between an upright storage position and a horizontal operative position, a rubber strip pivotally connected to said plate for pivoting about a vertical axis toward the vehicle side when said plate is in the operative position, said rubber strip being nippled for scraping the soles of a vehicle occupant's shoes prior to entering the vehicle.

2. The combination according to claim 1, wherein said bracket of said device is adapted to be secured to said vehicle by suitable fasteners received within openings of said flange of said bracket and said fasteners received openings of the main body of said bracket thus rendering said brackets stationary, said bolt means being carried at one end of said plate and comprising a bolt extending through said apertures and secured therein by a nut and a lock washer.

3. The combination according to claim 2, wherein said rubber strip is bonded to said plate.

* * * * *